US008626730B2

(12) United States Patent
Enenkiel

(10) Patent No.: US 8,626,730 B2
(45) Date of Patent: Jan. 7, 2014

(54) DATA PROCESSING METHODS, SYSTEMS AND COMPUTER PROGRAMS FOR PROVIDING A PAYMENT USING A WEB SERVICE

(75) Inventor: Achim Enenkiel, Karlsruhe (DE)

(73) Assignee: SAP AG, Walldorf (DE)

( * ) Notice: Subject to any disclaimer, the term of this patent is extended or adjusted under 35 U.S.C. 154(b) by 708 days.

(21) Appl. No.: 11/166,104

(22) Filed: Jun. 27, 2005

(65) Prior Publication Data

US 2006/0015459 A1    Jan. 19, 2006

(30) Foreign Application Priority Data

Jun. 28, 2004   (EP) .................................... 04015116

(51) Int. Cl.
*G06F 17/30* (2006.01)
(52) U.S. Cl.
USPC ............. 707/703; 707/770; 707/809; 705/21; 705/40
(58) Field of Classification Search
USPC ........................ 707/703, 770, 809; 705/21, 40
See application file for complete search history.

(56) References Cited

U.S. PATENT DOCUMENTS

| | | | | |
|---|---|---|---|---|
| 4,799,156 A | * | 1/1989 | Shavit et al. ..................... | 705/26 |
| 4,947,028 A | * | 8/1990 | Gorog ............................ | 235/380 |
| 5,317,688 A | * | 5/1994 | Watson et al. ................. | 715/707 |
| 5,383,113 A | * | 1/1995 | Kight et al. ..................... | 705/40 |
| 5,701,451 A | * | 12/1997 | Rogers et al. .................... | 707/1 |
| 5,809,144 A | * | 9/1998 | Sirbu et al. ...................... | 705/53 |
| 5,991,733 A | * | 11/1999 | Aleia et al. .................. | 707/104.1 |
| 6,230,166 B1 | * | 5/2001 | Velamuri et al. ....... | 707/999.104 |
| 6,389,403 B1 | * | 5/2002 | Dorak, Jr. ....................... | 705/52 |
| 6,604,135 B1 | | 8/2003 | Rogers et al. | |

(Continued)

FOREIGN PATENT DOCUMENTS

| | | |
|---|---|---|
| EP | 0969430 A1 | 1/2000 |
| EP | 1014282 A1 | 6/2000 |

(Continued)

OTHER PUBLICATIONS

A. Tomqvist et al., "XML and Objects—The Future for E-Forms on the Web," *Enabling Technologies: Infrastructure for Collaborative Enterprises*, Proceedings, IEEE 8th International Workshops in Stanford, CA, Jun. 16, 1999, pp. 303-308.

(Continued)

*Primary Examiner* — Debbie Le
(74) *Attorney, Agent, or Firm* — Finnegan, Henderson, Farabow, Garrett & Dunner, LLP

(57) ABSTRACT

Data processing systems and methods are disclosed for providing a payment using a Web service. In one implementation, a first computer is used for entry of data values into respective data entry fields of an electronic data entry form. Further, an identifier of the Web service, such as the uniform resource locator (URL) of the Web service, is entered into the first computer. Next, the first computer initiates data processing for providing the payment that is to be performed by a second computer on the basis of the data values entered into the electronic data entry form. The initiation and/or performance or completion of the data processing is signaled to the Web service by sending corresponding signaling data, which includes payment advice data of the payment. The Web service is coupled to a third computer that receives a result of the data processing from the second computer.

15 Claims, 5 Drawing Sheets

(56) References Cited

U.S. PATENT DOCUMENTS

| | | | |
|---|---|---|---|
| 6,651,217 B1* | 11/2003 | Kennedy et al. | 715/224 |
| 6,662,340 B2* | 12/2003 | Rawat et al. | 715/236 |
| 6,850,950 B1* | 2/2005 | Clarke et al. | 707/104.1 |
| 7,707,120 B2* | 4/2010 | Dominguez et al. | 705/78 |
| 2001/0049632 A1 | 12/2001 | Rigole | |
| 2002/0087583 A1* | 7/2002 | Morgan et al. | 707/200 |
| 2002/0147733 A1* | 10/2002 | Gold et al. | 707/200 |
| 2002/0156846 A1* | 10/2002 | Rawat et al. | 709/203 |
| 2003/0018661 A1 | 1/2003 | Darugar | |
| 2003/0028792 A1* | 2/2003 | Plow et al. | 715/507 |
| 2003/0055624 A1 | 3/2003 | Fletcher et al. | |
| 2003/0055868 A1 | 3/2003 | Fletcher et al. | |
| 2003/0093436 A1 | 5/2003 | Brown et al. | |
| 2003/0110242 A1 | 6/2003 | Brown et al. | |
| 2003/0163513 A1 | 8/2003 | Schaeck et al. | |
| 2003/0172090 A1* | 9/2003 | Asunmaa et al. | 707/200 |
| 2003/0187841 A1 | 10/2003 | Zhang et al. | |
| 2004/0003130 A1 | 1/2004 | Becker et al. | |
| 2004/0045005 A1 | 3/2004 | Karakashian | |
| 2004/0064503 A1 | 4/2004 | Karakashian et al. | |
| 2004/0181749 A1* | 9/2004 | Chellapilla et al. | 715/505 |
| 2005/0198563 A1* | 9/2005 | Kristjansson | 715/507 |
| 2005/0257134 A1* | 11/2005 | Goodman et al. | 715/507 |
| 2005/0257148 A1* | 11/2005 | Goodman et al. | 715/534 |

FOREIGN PATENT DOCUMENTS

| | | |
|---|---|---|
| EP | 1081617 A2 | 3/2001 |
| WO | WO 00/42540 A2 | 7/2000 |
| WO | WO 02/37393 A2 | 5/2002 |

OTHER PUBLICATIONS

European Search Report, dated Feb. 11, 2005, 4 pages.

* cited by examiner

DATA PROCESSING METHODS, SYSTEMS AND COMPUTER PROGRAMS FOR PROVIDING A PAYMENT USING A WEB SERVICE

FIELD OF THE INVENTION

The present invention generally relates to the field of data processing systems and related methods. More particularly, the invention relates to systems and methods for processing data in a Web service environment.

BACKGROUND OF THE INVENTION

Web services are an emerging technology and offer the dual promise of simplicity and pervasiveness. Web services represent the next level of function and efficiency in e-business. A Web service may be viewed as any mechanism by which an application or data processing service may be provided to other applications on the Internet.

Web services may be informational or transactional. That is, some services provide information of interest to the requestor, while other services may actually lead to the invocation of business procedures. Examples of publicly available Web services today include stock quote services, services to retrieve news from Web news sources, and currency conversion services. By way of example, U.S. Pat. No. 6,604,135 discloses a method and system for location-based Web services.

For more detailed information on Web services and technologies related thereto, reference is made to pages or documents on the websites of Microsoft Germany, W3.orq, and n.ethz.ch.

One example of Web services are the services responsive to simple object access protocol (SOAP) messages. SOAP is an application invocation protocol that defines a protocol for exchanging information encoded as XML messages. Normally, these services are described by WSDL (Web Service Description Language) notation stored in WSDL documents. A WSDL document may be stored in numerous ways such as in a file, in a DB2 XML registry/repository, or in a DB2 based UDDI registry, for example. UDDI (Universal Description, Discovery, Integration) is a protocol for describing Web services such that interested parties may easily discover them. Specifications for this registry and use of WSDL in the registry are available at uddi.org. Service providers may register their services in a UDDI, specifying technical information about how to invoke the service. Often a WSDL document is stored in a UDDI registry in order to define the messages a particular Web service accepts and generates.

The design of UDDI allows enterprises that own Web service enabled applications to publish data about themselves and their services. By providing this information, UDDI implements a simplified form of searching for those interested in locating a particular Web service in which to fulfill an application process. The conventional UDDI search is focused on single search criteria, such as business name, business location, business categories, business identifier, service type by name, and/or discovery URL (Uniform Resource Locator).

Various approaches for implementing Web services are known, such as described in U.S. Patent Publication Nos. 2003/0093436A1, 2003/0055868A1, 2003/0055624A1, 2003/0018661A1, 2003/0110242A1, 2003/0163513A1, 2004/0064503A1, 2004/0045005A1, 2004/0003130A1, and 2003/0187841A1.

It is a common disadvantage of conventional Web services that they usually require some degree of manual user interaction. Manual user interaction is tedious and error prone. Another disadvantage of manual interaction is that data, which is already available in electronic form, needs to be manually re-entered into the Web service. In particular, the level of manual interaction and monitoring required by known Web services is costly in terms of the required human resources.

SUMMARY OF THE INVENTION

In accordance with embodiments of the invention, data processing systems and methods are disclosed for providing a payment using a Web service. A first computer is used for entry of data values into respective data entry fields of an electronic data entry form. Further, an identifier of the Web service, such as the uniform resource locator (URL) of the Web service is entered into the first computer. Next, the first computer initiates a data processing step for providing the payment that is to be performed by a second computer on the basis of the data values entered into the electronic data entry form. Alternatively, the data processing step is not to be performed by the second computer, but by the first computer or another component coupled to the first computer. The initiation and/or performance or completion of the data processing step is signaled to the Web service by sending of corresponding signaling data. The signaling data has payment advice data of the payment. The Web service is coupled to a third computer that receives a result of the data processing step from the second computer, e.g., in the form of an XML data stream.

One advantage of embodiments of the invention is that the third computer may be pre-warned regarding reception of the payment data resulting from the data processing step performed by the first or second computer. For example, the third computer may periodically query the Web service for signaling data that has been received by the Web service. Alternatively, the Web service may implement a push service for pushing information to the third computer in response to receipt of the signaling data. The signaling data that the third computer receives from the Web service may be used in various ways for controlling the data processing performed by the third computer.

In accordance with another embodiment, the payment advice data contains the incoming payment details required for assigning and clearing the relevant open item. Typically, payment advice data contains the payment amount, payment date, and other information about the payment. The payment advice data also includes advice data items that contain information on the paid items. They may also further contain information used for identification purposes, such as document number, reference number, billing document number, customer reference number, and so on. The payment advice data may be used during payment clearing to search for and assign open items automatically.

Embodiments of the present invention may avoid a need for transmission of payment advice notes from a payer to a payee by means of regular mail, e-mail, or by fax. Conventional transmission methods have the disadvantage that the data contained on the payment advice notes must be manually re-entered into the payee's financial computer system. An advantage of embodiments of the present invention is that such additional error prone and tedious manual interaction may be avoided.

It is also known from conventional solutions to transmit payment advice notes by means of an electronic message, such as EDIFACT. One of the problems associated with this is that the payer needs to know the exact address of the processing entity of the financial processing system of the payee, which is to receive the payment advice note in order to enable automatic processing. An advantage of embodiments of the present invention is that as the payer computer system does not need to be aware of the exact format used by that processing entity of the payee's financial computer processing system.

In accordance with a further embodiment of the invention, payment advice data is not only received for incoming payments, but also for outgoing payments. When a direct debiting procedure is used, the payment is initiated by the payee computer rather than by the payer computer. In this instance, payment advice notes are provided from the payee computer to the payer computer.

The Web service may be an integral part of the third computer. In this instance, the third computer has a Web services interface for receiving signaling data in accordance with the HTTP request-response protocol and an internal interface to a data processing and/or control application for synchronous or asynchronous further processing of the signaling data. Alternatively, the Web service may be implemented as an integral part of the first computer or the second computer. In this instance, the first or the second computer has an internal interface for providing signaling data to the Web service and the third computer has an external interface for receiving the data from the Web service, e.g., in accordance with the HTTP request-response protocol.

In another embodiment, the Web service is implemented on a separate Web-server computer that is loosely or closely coupled to the first, second, or third computer system. For example, the Web service stores the signaling data that is addressed to the third computer in a data file. The resultant data file with the accumulated signaling data is forwarded from the Web service to the third computer periodically, for example, when the size of the file has reached a predetermined limit or at scheduled time intervals.

Depending on the implementation, the Web service may be operated by the initiator of the data processing step, e.g., the payer's computer, or by the executor of the data processing step, e.g., the bank's computer, or by the recipient of the result of the data processing step, e.g., the payee's computer. In any case, the signaling data is transmitted to the Web services for reference by the third computer.

In accordance with a further embodiment of the present invention, the Web service is implemented as a hub and collects signaling data for a plurality of third computer systems. In this instance, the signaling data may be advantageously stored in a database of the Web-server using a unique identifier of the third computer to which the signaling data is addressed as a database key. The database is queried periodically for new signaling data that has been received for a given third computer in order to forward the new signaling data to the third computer.

Embodiments of the invention may be utilized in different fields of application, such as financial transactions. For example, when a customer receives an invoice from a service provider, the invoice may be received by the customer in paper form or in electronic form, such as in the form of an XML document. The payment data is manually or automatically entered into the customer's computer for initiation of the payment procedure, and after completion of the data entry into the online payment transaction form, the payment data is transmitted to a second computer for execution of the payment. For example, the second computer may be a computer of the customer's bank.

The result of the data processing step performed by the bank's computer, i.e., the execution of the payment, is transmitted as corresponding payment data to the third computer, i.e., a computer of the payee. When the payment procedure is initiated the customer's computer and/or the bank's computer sends signaling data comprising payment advice data to the Web service that is coupled to the payee's computer. Alternatively, the customer mails a paper form for ordering payment from his or her account to his or her bank. In this instance, the payment order data is entered into the bank's computer that takes the role of the first computer.

By way of example, the planned execution date of the payment procedure may be communicated to the Web service in order to announce the pre-scheduled payment. This has the advantage that the payee's computer may receive an early warning regarding the scheduled payment procedure, such that sending of an unnecessary payment reminder may be avoided. Another advantage is that the scheduled payment may be entered into the payee computer's financial planning system.

As a consequence, the payee's computer is pre-warned that payment of an open invoice is imminent. This information may be used by the payee's computer to avoid sending unnecessary payment reminders, for the purpose of financial planning and/or other purposes.

In accordance with another embodiment of the invention, the data values that are entered into the electronic data entry form provided by the first computer are received in electronic form, such as by means of an XML document. Further, the identifier of the Web service is also received in electronic form by the first computer. In addition to the identification of the Web service, the XML document may also comprise the WSDL (Web service description language) description of the identified Web service. It is to be noted that WSDL and UDDI are as such known and standardized, as is demonstrated by pages or documents on the websites of Microsoft Germany, W3.org, and n.ethz.ch.

In accordance with a further embodiment of the invention, the signaling data for signaling initiation of the data processing step is directly sent from the first computer to the Web service. Alternatively, the signaling data is sent from the second computer to the Web service.

In accordance with another embodiment of the invention, the signaling data comprises an identifier of the second computer. The signaling data is stored in the database provided by the Web service using the identifier of the third computer as a key. The third computer may periodically query the Web services database in order to check if signaling data has been received and stored in the database. This may be implemented both as a push or a pull service of the Web service.

It is to be noted that a database is not necessary for most applications. Rather, the signaling data is stored in a data file by the Web service. The data file with the accumulated signaling data is transmitted, e.g., after pre-scheduled time intervals to the third computer.

In accordance with a further embodiment of the invention, the signaling data comprises a time stamp that indicates the time when the data processing step for providing the payment has been initiated or performed. The time information may be used as an additional control parameter by the third computer.

In accordance with yet another embodiment of the invention, a computer network, such as the Internet, an intranet, or an extranet, provides the communication means for operatively coupling the first, second, and third computers as well as the Web service to the third computer.

In accordance with still another embodiment of the invention, the XML document is received by the first computer from the third computer. The XML document comprises data values and mark-up data being descriptive of the assignment of the data values to respective data entry fields of an electronic data entry form and an identifier of a Web service. The data values are read by the first computer and they are entered into respective data entry fields of an electronic data entry form identified by the mark-up data.

In accordance with a further embodiment of the invention, a data processing step is initialized on the basis of the data values entered into the electronic data entry form by the first computer and the data processing step is performed using a second computer. The reading of the data values and entering the data values into respective data entry fields of an electronic data entry form may be performed as a result of a drag and drop action executed in a Graphical User Interface (GUI) environment. Then, the result of the data processing step is sent to the third computer by the second computer, and the signaling data is sent by the first computer to the Web service.

In accordance with another embodiment of the invention, XML document includes a control parameter utilized for execution of said data processing step and the identifier of the Web service is an Uniform Resource Locator (URL), wherein each signaling data further comprises at least one of the data values, a time stamp identifying a date and time when at least one of the data values is sent, and an identifier identifying the sender computer.

In accordance with an additional embodiment of the invention, data processing includes an account payment procedure and the account payment procedure includes a rebate feature.

In accordance with a further embodiment of the invention, an invoice is received in an electronic form, such as by means of an XML document. The XML document contains data that specifies one or more payments to be provided from the payer to the payee. In addition, the XML document may contain a link to a Web service provided by the payee for collection of payment advice data. The payment procedure and the sending of the payment advice data are initiated by the user by performing a drag-and-drop operation on the XML document.

For example, the user selects the XML document and positions the XML document on an icon of the online banking software of his or hers first computer. This invokes the online banking software of the user's first computer. The online banking software automatically reads the data from the XML document that specifies the one or more payments to be provided to the payee as well as the link to the Web service.

On this basis, the online banking software generates an electronic payment order that is sent to the computer of the payer's bank, i.e., the second computer. In addition, the online banking software uses at least a sub-set of the data contained in the XML document and/or additional data as payment advice data and sends the payment advice data as signaling data to the Web service as identified by the link.

Alternatively or in addition, the online banking software includes the link of the Web service in the payment order that is transmitted to the computer of the payer's bank, such that the computer of the payer's bank may send the signaling data with the payment advice data to the Web service provided by the payee.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

In the following, exemplary embodiments of the invention will be described in greater detail by making reference to the drawings in which.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
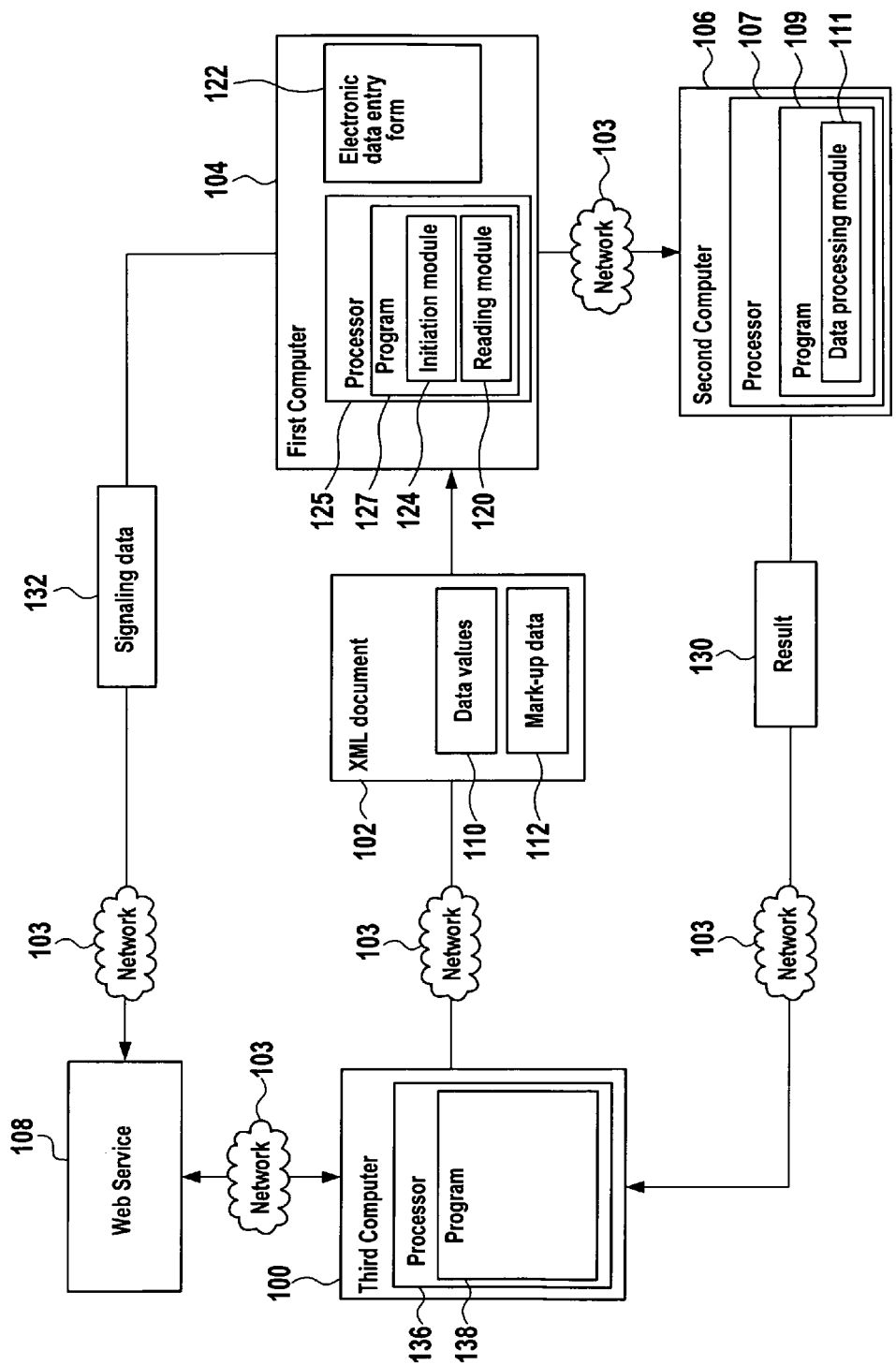
FIG. 1 illustrates an exemplary data processing system for providing a payment in a Web-based service environment, consistent with the present invention.

FIG. 1 illustrates an exemplary data processing system for providing a payment from a payer to a payee. The payer includes a first computer 104 that is coupled to a second computer 106 via a network 103. The second computer 106 may comprise the computer of the payer's bank in the example considered here.

The payee has third computer 100 that is closely or loosely coupled to a Web service 108. In the embodiment considered here, the Web service 108 is coupled to third computer 100 by means of network 103. Web service 108 serves for collecting signaling data 132 comprising payment advice data of payments that have been initiated from the first computer 104.

First computer 104 serves for entry of data specifying one or more payments to be provided from the payer to the payee. The data entry may be performed manually, automatically or semi-automatically. In the embodiment considered here, first computer 104 may receive an XML document 102 that carries the data specifying the one or more payments to be provided from the payer to the payee.

The XML document 102 may be received on a data carrier, by email, or by means of another transmission channel from the third computer 100 of the payee or another entity that is used by the payee for its billing procedure. In the example considered here, the XML document 102 is transmitted from the payee's third computer 100 to the first computer 104 of the payer via network 103. The network 103 may be any communication or computer network, such as the Internet.

The first computer 104 includes a processor 125 and a program 127, which further comprises a reading module 120 and an initiation module 124. The reading module 120 serves to capture data values 110 included in the XML document 102 and to enter these data values into respective data entry fields of an electronic data entry form 122, identified by the mark-up data 112. The initiation module 124 serves to invoke the second computer 106 in order to begin the data processing step.

The XML document 102 comprises a set of data values 110 specifying the payment to be provided to the payee, and the mark-up data 112 being descriptive of the assignment of data values to data entry fields of an electronic data entry form.

The second computer 106 includes a processor 107 and a program 109. The program 107 has a data processing module 111 responsible for processing of the data values 110. When the second computer completes the data processing step, it sends the result 130 of the data processing step to the third computer 100 over the network 103. Also, signaling data 132 is sent by the first computer 104 to the Web service 108. The signaling data 132 comprises the payment advice data of the initiated payment. For example, at least a sub-set of the data values 110 and/or other information is used as payment advice data that is transmitted as signaling data 132 to the Web service. The other information contained in the payment advice data may be a time stamp indicating when the payment procedure has been initiated. Alternatively, the data processing step is not performed by the second computer but by the first computer.

In operation, the XML document 102 is received by the first computer 104 from the third computer 100. The processor 125 executes the program 127, which in turn starts the reading of data values 110 contained in the XML document 102. Then, the data values are entered automatically into respective data entry fields of an electronic data entry form 122 identified by the mark-up data 112. The capture of data values into the data fields of the electronic data form is accomplished by the utilization of reading module 120 allowing automatic capture of data values into the plurality of fields of an electronic data entry form 122. Alternatively, the data is entered manually, in whole or in part.

Next, the program 127, having an initiation module 124, starts the data processing step by invoking the second computer 106. The second computer's processor 107 executes the program 109 having a data processing module 111, which on the basis of the data values entered into the electronic data entry form by the first computer, performs the data processing step, ending in the result 130 being sent to the third computer 100 over the network 103. The result 130 is the payment amount provided from the payer to the payee.

Simultaneously, the first computer 104 may send the signalling data 132 to the Web service 108, where the signaling data is stored in the database of the Web service 108. The signaling data is then further utilized for the controlling of the processing of the result 130 by the third computer 100 where the processor 136 executes the program 138.

It is to be noted that the signaling data 132 may also be transmitted from the second computer 106 to Web service 108 via network 103. Further, it is to be noted that XML document 102 may be provided by a fourth computer (not shown in FIG. 1). In other words, the source of the XML document 102 and the receiver of result 130 do not need to be identical. In fact, the third and fourth computers may belong to different organizational entities.

Further, it is to be noted that it is not essential that the data values 110 are received in an electronic form. Embodiments of the present invention are also applicable when the data values are received in paper form for manual entry into the electronic data entry form 122.

Figure 2:
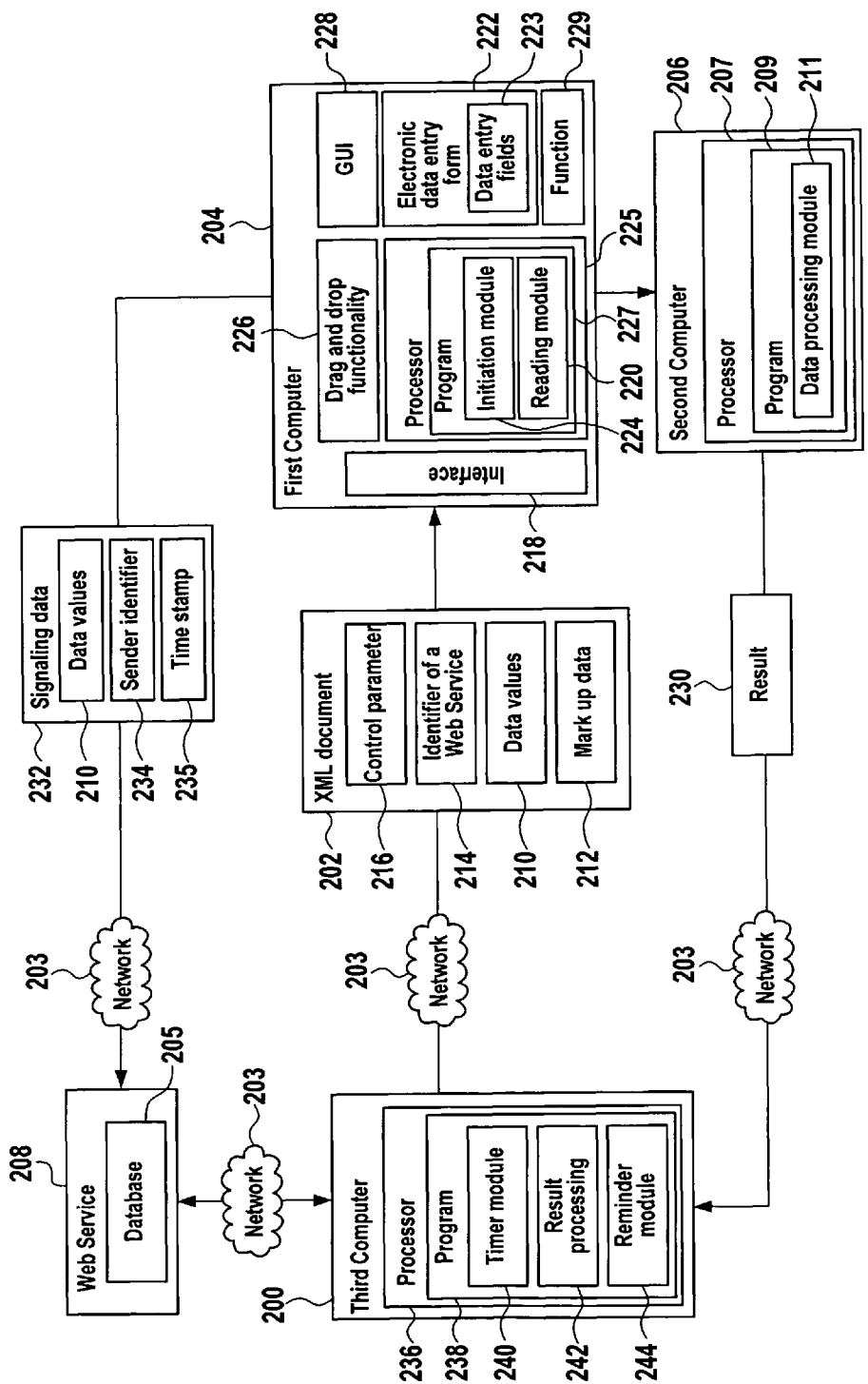
FIG. 2 illustrates another exemplary data processing system, consistent with the present invention.

FIG. 2 illustrates another exemplary data processor system for providing a payment in a Web-based service environment. The embodiment of FIG. 2 constitutes a logical continuation of FIG. 1, where like elements are referenced by like reference numbers having added 100.

In FIG. 2, a third computer 200, including a processor 236, a program 238, and a plurality of modules 240 to 244 is provided. The third computer 200 transmits an XML document 202 to a first computer 204. The XML document may comprise a control parameter 216, an identifier of the Web service (URL) 214, a set of data values 210, and mark-up data 212.

Alternatively, the document is received in ordinary paper form by a user of the first computer 204. In this case, the user needs to scan the paper form or to manually enter the data values into the electronic form provided by the first computer 204.

The first computer 204 includes a processor 225 and the program modules 227, 220 and 224. The program module 227 has a reading module 220 that captures the data values 210 and allows them to be entered into respective data entry fields including the compulsory fields of an electronic data entry form 222. The initiation module 224 serves to execute a data processing step on the basis of the data values 210 entered into the electronic data entry form 222 by the first computer 204. The initiation module 224 invokes a second computer 206 to start the data processing step.

The first computer 204 further comprises an interface 218 that is designed to recognize the format of the XML document 202. Program module 227 executes a function 229 that allows automatic filling out of the electronic data entry form 222 on the basis of the XML document's format. The automatic filling out of the form is performed when the user uses a drag and drop functionality 226 available in the graphical user interface environment 228.

The second computer 206 includes a processor, which serves to execute program modules 209 and 211. Program module 209 has a data processing module 211 that is responsible for the processing of the data values. The result of the data processing step is sent to a third computer 200 utilizing a network 203. In the next step, the first computer 204 sends signaling data 232 to the Web service 208 over the network 203.

The signaling data 232 comprises at least one of the data values 210, a time stamp 235, identifying a date and a time when at least one of the data values is sent, as well as identifier 234 for identification of a third computer 200. The Web service 208 comprises a database 205 for storage of signaling data 232.

In operation, utilizing the network 203 the third computer 200 sends an XML document 202 to the first computer 204. The XML document comprising a plurality of data values 210, and a control parameter 216 utilized for execution of the data processing step, as well as identifier of a Web Service (URL) 214, and the mark-up data 212 being descriptive of the assignment of data values to the data entry fields of an electronic data entry form is received by the first computer 204. The control parameter 216 specifies a rule that is executed by the first computer's program 227 in order to determine the amount of the result 230. The data values are captured into the respective data entry fields 223 of the electronic data entry form 222 utilizing a reading module 220.

Then, the initiation module 224 may invoke the second computer 206 and thus begin the data processing step, whereby the user is able to control when the data values of the XML document are entered into the electronic data entry form by using, for example, drag and drop functionality 226. In one embodiment, the XML document is moved onto an icon representing an accounts payable application software component, such as an online banking software, containing the program 227 using graphical user interface 228. As a consequence of this drag-and-drop operation performed by the user, the initiation module 224 is activated.

The processor 207 of the second computer 206 completes processing of the data utilizing a data processing module 211. The result 230 is sent to the third computer 200 utilizing the network 203. Simultaneously, the first computer sends the signaling data 232 to the Web service 208, where the signaling data contains data values 210, the sender identifier 234, and the time stamp 235 is stored in the database 205 of the Web service 208. Also, the control parameter 216 is communicated to the Web Service by the signaling data 232.

The signaling data 232 stored in the database 205 of the Web service is utilized for the controlling of the processing of the result 230. When the reminder module 244 determines that the result, i.e., the payment is overdue and that the reminder should be initiated, it uses the signaling data 232 that has been received by Web service 208 in order to find out if the result processing was initiated. If the result processing module 242 determines that signaling data 232 containing the respective payment advice data of the overdue payment has been received by Web service 208, the reminder module invokes a timer module 240, which is set for the predetermined amount of time to allow for the processing. However, if the predetermined amount of time expires and the result 230 still does not arrive, in this case the reminder module 244 initiates sending a payment reminder.

Figure 3:
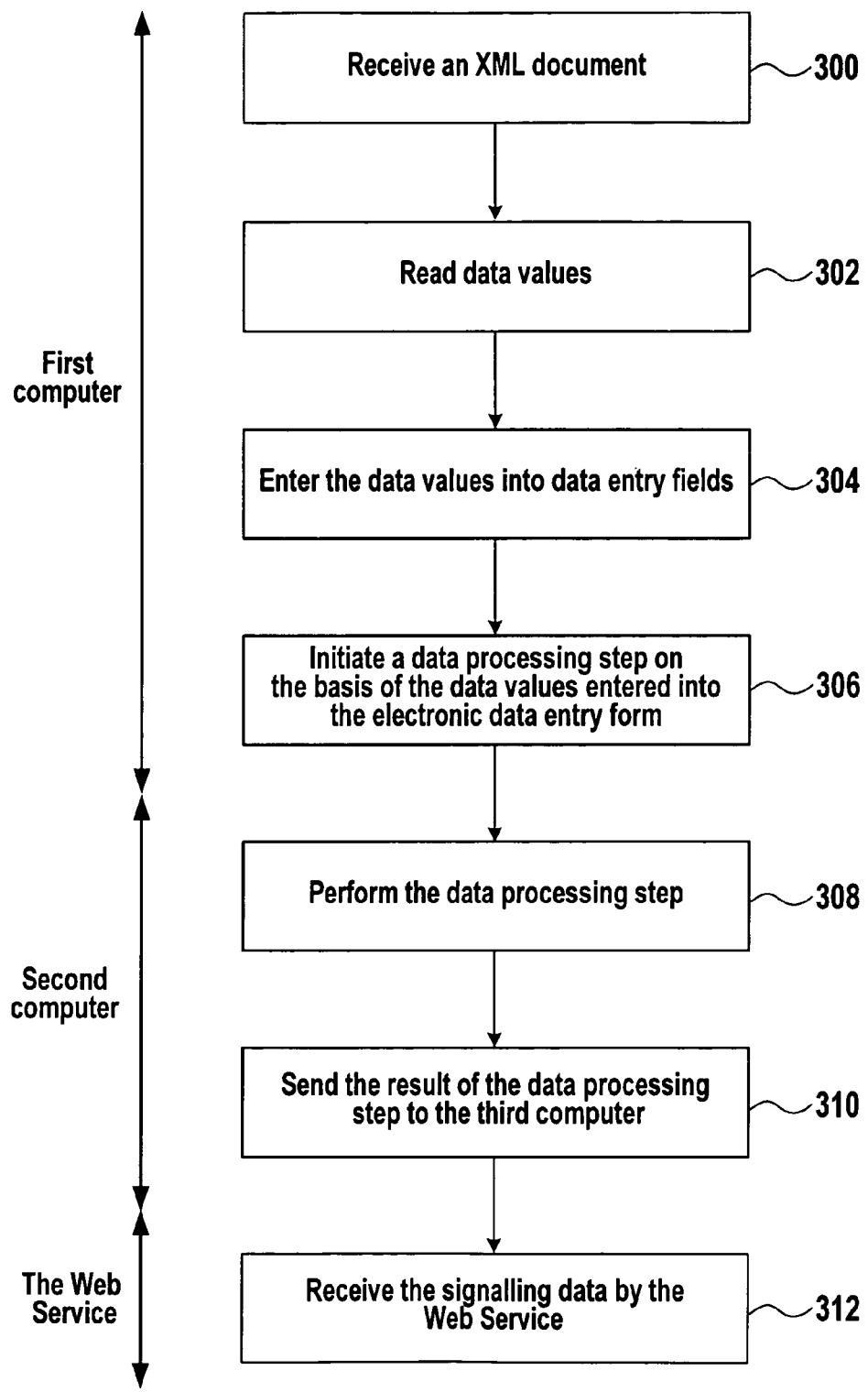
FIG. 3 illustrates a flowchart of an exemplary data processing a method, consistent with the present invention.

FIG. 3 shows a flowchart of an exemplary data processing method. In step 300, an XML document is received from a sender computer by a first computer, the XML document containing data values, and mark-up data being descriptive of the assignment of data values to data entry fields of an electronic data entry form and an identifier of a Web service. In the next step 302, the data values contained in the XML document are read by the reading module. In step 304, the data values are entered into respective data entry fields of an electronic data entry form identified by the mark-up data by the first computer. In step 306, a data processing step is initiated on the basis of the data values entered into the electronic data entry form by the first computer. In step 308, the data processing step is performed using a second computer. Then in step 310, the result of the data processing step is sent to the sender computer by the second computer. In the last step 312, a signaling data is sent for signaling initiation of the data processing step by the first computer to the Web Service.

Figure 4:
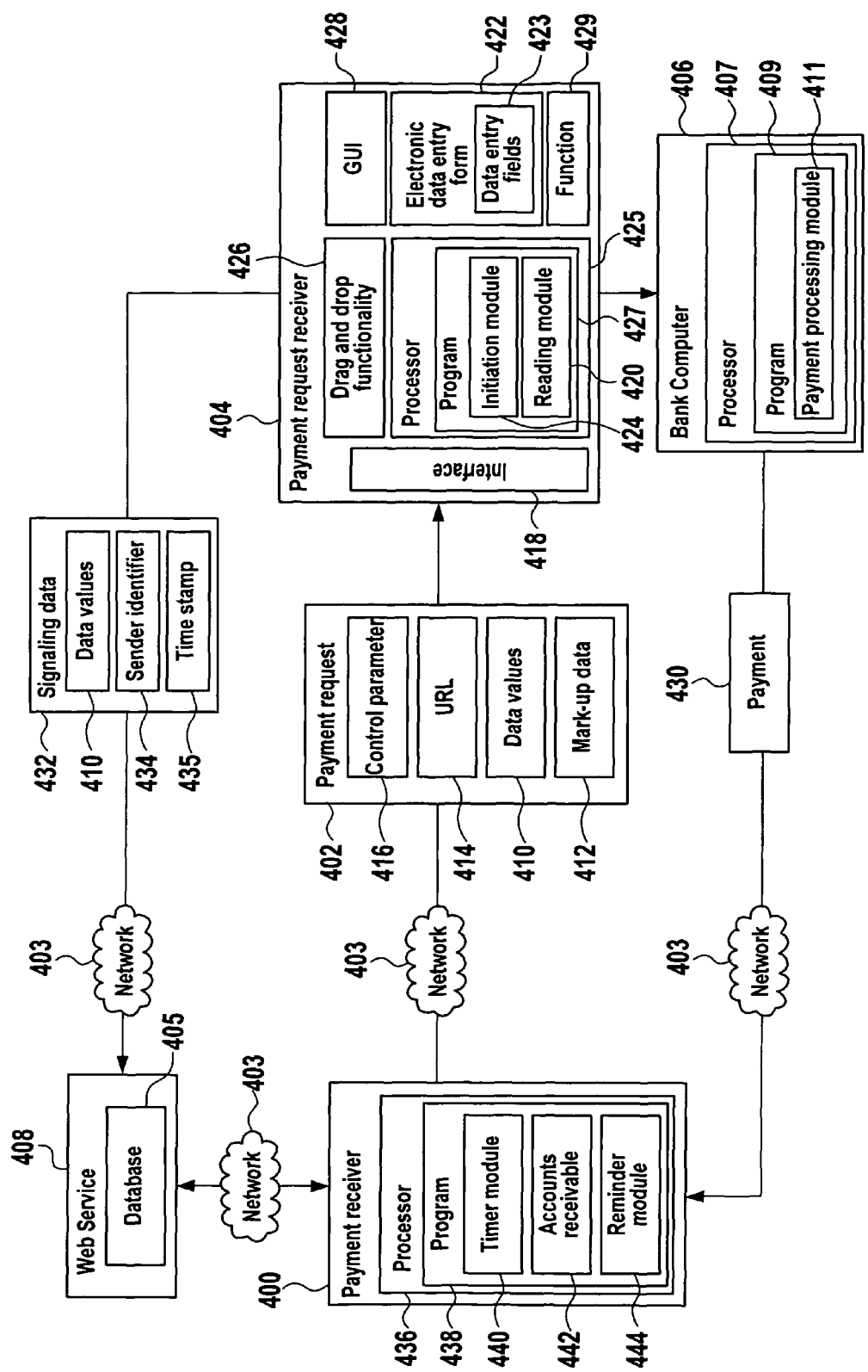
FIG. 4 illustrates an exemplary financial computer system for processing account information in a Web-based service environment, consistent with the present invention.

FIG. 4 illustrates a detailed embodiment of an exemplary data processing system of the present invention for use as a financial/banking online system. Elements of FIG. 4 that correspond to elements of FIG. 2 are designated by like reference numerals.

Payment receiver 400 includes a processor 436, a program 438 which comprises timer module 440, accounts receivable module 442, and reminder module 444. Processor 436 serves to execute program modules 440, 442, and 444. Program module 438 comprises an account receivable module 442 for processing of payment 430. The payment receiver 400 sends payment request 402 utilizing a network 403 to a payment request receiver 404. The payment request 402 comprises control parameter 416, Uniform Resource Locator (URL) 414, data values 410, and mark-up data 412. The mark-up data 412 being descriptive of the assignment of data values to their data entry fields of an electronic data entry form. Alternatively, payment request 402 is received in the form of a paper document. It is not essential that payment request 402 be received in electronic form.

In accordance with one embodiment, the first computer is a payment request receiver 404 comprising an interface 418, a processor 425, a program 427, an initiation module 424, and a reading module 420. The payment request receiver 404 further comprises an electronic data entry form 422 with the plurality of data entry fields 423, a graphical user interface 428, a drag and drop functionality 426, and a function 429.

An interface 418 recognizes the format of the payment request 402. The format contains such payment information as credit organization, bank connection, and the amount of the total payment. The processor 425 serves to execute the program modules 424 and 420. The initiation module 424 initiates a data processing step on the basis of the data values entered into the electronic data entry form 422 by the first computer, in this case a payment request receiver 404. The performance of the data processing step takes place using a second computer, in this embodiment the second computer being a bank computer 406.

Program module 427 includes a reading module 420, which serves to capture the data values and enter them into respective data entry fields of an electronic data entry form 422. The electronic data entry form has a plurality of data entry fields 423. Program module 427 serves also to execute the function 429, which allows on the base of format, to automatically fill out an electronic data entry form 422. The reading of data values 410 and entering the data values 410 into respective data entry fields 423 of an electronic data entry form 422 is performed in a response to drag and drop functionality 426 used in a graphical user interface environment 428.

Bank computer 406 includes a processor 407, which serves to execute program modules 409 and 411. Program module 409 includes a payment processing module 411, which performs an operation resulting in sending the payment 430 to the payment receiver 400. The payment request receiver 404 or the bank computer 406 sends the signaling data 432 to the Web service 408 utilizing a network 403. Each signaling data 432 comprises, e.g., at least one of the data values 410, a time stamp 435 identifying a date and/or a time when at least one of the data values is sent, and an identifier 434 identifying the payment receiver 400. Signaling data 432 may be stored in a database 405 of a Web service 408 in order to be used for controlling the processing of a payment 430.

In operation, payment receiver 400 sends payment request 402 to the payment request receiver 404 utilizing the network 403. When the payment request receiver 404 receives a payment request 402 comprising an URL, a control parameter 416, utilized for execution of payment processing step, and the mark-up data 412 being descriptive of the assignment of data values to data entry fields 423, the reading of the data values 410 and entering of the data values 410 into respective data entry fields 423 takes place. The control parameter 416 provides a rule that is executed by the payment request receiver 404 in order to determine the payment amount. For example, the rule allows a discount of three (3) percent if the payment is performed within a week.

Next, the payment processing step is initiated on the basis of the data values entered with the help of initiation module 424 which invokes the bank computer 406 to start payment processing. The automatic filling out of electronic data entry form 422 takes place when the user using graphical user interface 428 drags and drops the icon of payment request 402 into the online banking software. The program 427 then executes the function 429, which allows on the basis of the format of the payment request 402 to automatically fill out the electronic data entry form 422.

Subsequently, the processor 407 of the bank computer 406 executes the program 409, which includes a payment processing module 411 that completes the payment processing step and sends the payment 430 to the payment receiver 400 utilizing the network 403.

In the next step, the payment request receiver 404 sends signaling data comprising at least one of the data values 410, a time stamp 435 identifying a date and the time when at least one of the data values is sent to the database 405 of a Web service 408, and a sender identifier 434 as payment advice data. The signaling data 432 also communicates the control parameter 416 with the respective rules containing information about the rebate amount to the Web Service. Subsequently, the signaling data 432 is stored in a database 405, in order to be used for controlling of the processing of a payment by accounts receivable 442.

Alternatively to sending the signaling data after completion of the payment processing step, the signaling data is already sent when the order for performance of the payment processing step is generated or sent to the bank computer 406 by request receiver 404 or when the order is received by bank computer 406. In this instance, the signaling data includes the date of the planned payment.

When the reminder module 444 determines that the payment 430 is overdue, instead of sending the reminder right away, it attempts to find out if payment was initiated on the basis of the signaling data 432. For example, the reminder module 444 downloads the most up-to-date signaling date 432 from the Web service 408. If accounts receivable module 442 determines that the downloaded signaling data contains the information that the payment 430 was initiated, the reminder module invokes a timer module 440, which is set for the predetermined amount of time to allow for the processing. However, if the predetermined amount of time expires and the payment still does not arrive, the reminder module 444 initiates sending a reminder.

Utilizing the signaling data 432, which also communicates the control parameter 416 with the rules governing the payment amount, allows the incorporation of a rebate feature in the account payment procedure allowing different amount of a discount, for example, 3%, 5%, or 10% based on the amount of time that passes until the actual payment 430 is received.

Figure 5:
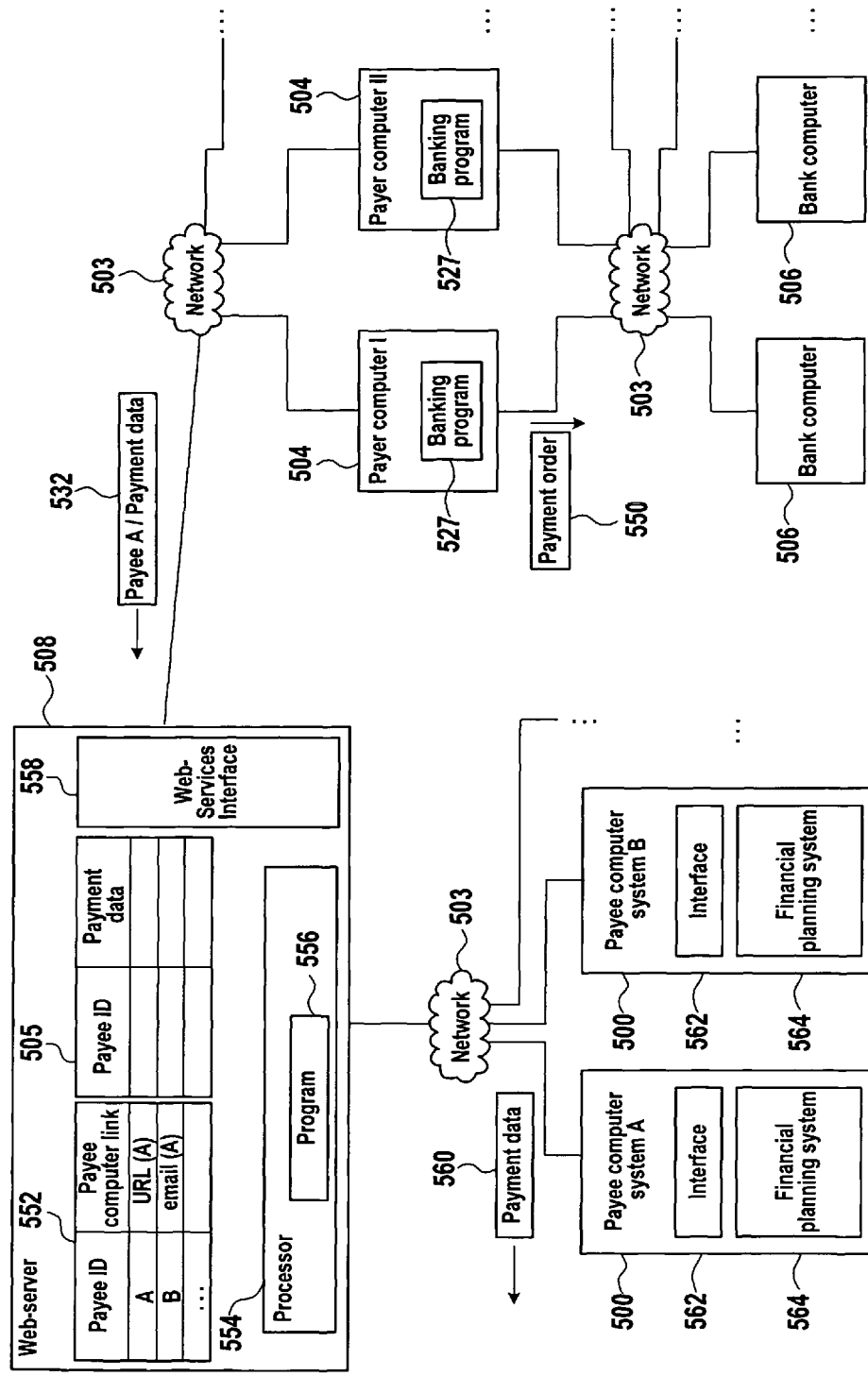
FIG. 5 illustrates a block diagram of a further embodiment of a data processing system, consistent with the invention.

FIG. 5 illustrates a block diagram of another embodiment, consistent with the present invention. Elements in the embodiment of FIG. 5 corresponding to elements of FIG. 1, 2, or 4 are designated by like reference numerals. The embodiment of FIG. 5 includes a plurality of first computers 504 that belong to respective payers I, II, . . . . Each one of the first computers 504 includes a banking program 527 for entering a payment order 550. Likewise, a plurality of bank computers 506 are coupled to the plurality of first computers 504 via Internet 503.

The first computers 504 of the payers and/or the bank computers 506 may send signaling data 532 to Web-server 508 via Internet 503. The signaling data 532 includes at least an identifier of the payee that is to receive the payment and payment advice data, such as the amount of the payment and a pre-scheduled date when the payment procedure is to be executed and/or payment is expected to be received by the payee.

Web-server 508 includes storage 505 for storage of the signaling data it has received for the various payees that are registered in table 552. Table 552 may include an entry for each registered payee comprising the payee's identifier and address information regarding the payees computer, such as the payee's computer URL, email address, or other link information for sending electronic data.

Web-server 508 includes processor 554 for execution of computer program 556. Web services interface 558 of Web-server 508 serves for communication in accordance with the HTTP request-response protocol via network 503 (e.g., the Internet), in particular for receiving the signaling information 532. A plurality of third computers 500 belonging to respective payees A, B . . . are coupled to Web-server 508 via Internet 503. As shown in FIG. 5, each of the third computers 500 may include a Web-interface 562 and a financial planning system 564.

In operation, one of the payers enters a payment order into its computer system. Without restriction of generality, payer I is considered in the following. In response to the payer's I entry of the payment data into banking program 527, payment order 550 is transmitted via network 503 to payer's I bank's computer, i.e., one of the computers 506.

In addition, signaling data 532 is sent from payer's I computer 504 to Web-server 508 via network 503. Alternatively, the bank computer 506 sends signaling data 532 after receipt of payment order 550. Signaling data 532 is received by Web services interface 558 of Web-server 508 and is entered into storage 505. Consecutively, Web-server 508 may receive a sequence of additional signaling data 532 from various computers 504 of other payers or from various other bank computers 506. The respective signaling data is collected in storage 505 of Web-server 508 using the respective payee identifiers as a key.

The accumulated signaling data that is stored in storage 505 is transmitted to the respective payee computer systems 500 at periodic time intervals, such as each time new signaling data comes in, when the accumulated signaling data has reached a given size, at prescheduled points of time, or using other trigger criteria.

For example, program 556 processes each entry of table 552 by reading the respective accumulated payment data from storage 505 and sending the payment data as payment data 560 to the link given in table 552 for the respective payee via network 503 to the respective payee's computer system 500. In the example considered here, the payment data 560 of signaling data 532 is read from storage 505 and sent to the URL of payee computer system A 500 where it is received by interface 562. Payment data 560 is entered into financial planning system 564.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A data processing system for entering data values into data entry fields of an electronic data entry form, the system comprising first, second, and third computers and a Web service:

the first computer being configured to:
receive an XML document via a network, the XML document including:
address information corresponding to the Web service;
data values;
a control parameter identifying a rule to process at least one of the data values; and
mark-up data that identifies assignments of data values to the data entry fields;
enter the received data values into respective data entry fields of the electronic data entry form as identified by the mark-up data;
transfer the entered data values to the second computer via the network; and transfer signaling data to the Web service, without input by a user of the first computer of an address of the Web service, by automatically reading the address information, and connecting to the Web service based on the address information, the signaling data including:
the control parameter;
at least one of the data values; and
a time stamp, the time stamp corresponding to at least one of a date or time when the data processing step has been scheduled, initiated, or performed;
the second computer being configured to:
process the entered data values form to obtain a payment result, the payment result comprising an accounts receivable application component in the second computer that assigns the payment result to an open item; and
transmit the payment result to the third computer via the network;
the Web service being configured to:
store the signaling data in a data file;
determine whether a size of the data file is greater than or equal to a predetermined limit; and
initiate transfer of the signaling data to the third computer when the size of the data file is determined to be greater than or equal to the predetermined limit; and
the third computer being configured to:
receive the signaling data, before receipt of the payment result;
receive the payment result; and
process the payment result based on the received signaling data.

2. The data processing system of claim 1, wherein the first computer is adapted to send the signaling data to the Web service via the second computer.

3. The data processing system of claim 1, wherein the Web service is implemented in at least one of the first computer, the second computer, the third computer, and a fourth computer.

4. The data processing system of claim 1, wherein the signaling data comprises an identifier for identification of the second computer.

5. The data processing system of claim 4, wherein the Web service comprises a database for storing the signaling data using the identifier of the second computer as a key.

6. The data processing system of claim 1, wherein the Web service implements a push or a pull service for the second computer.

7. A computer implemented data processing method, the method comprising:
receiving, at a first computer, an XML document via a network, the XML document including:
address information corresponding to a Web service;
data values;
a control parameter identifying a rule to process at least one of the data values; and
mark-up data that identifies assignments of data values to data entry fields;
entering the received data values into respective data entry fields of an electronic data entry form as identified by the mark-up data;
transferring signaling data to the Web service, without input by a user of the first computer of an address of the Web service, by automatically reading the address information, and connecting to the Web service based on the address information, the signaling data including:
the control parameter;
at least one of the data values; and
a time stamp, the time stamp corresponding to at least one of a date or time when the data processing step has been scheduled, initiated, or performed;
processing the entered data values to obtain a payment result, the payment result comprising an accounts receivable application component that assigns the payment result to an open item;
storing the signaling data in a data file;
determining whether a size of the data file is greater than or equal to a predetermined limit;
initiating transfer of the signaling data to a second computer when the size of the data file is determined to be greater than or equal to the predetermined limit, wherein the second computer is configured to:
receive the signaling data, before receipt of the payment result;
receive the payment result; and
process the payment result based on the received signaling data.

8. A non-transitory computer-readable medium including instructions for performing a data processing method when executed with a processor, the method comprising:
receiving, at a first computer, an XML document via a network, the XML document including:
address information corresponding to a Web service;
data values;
a control parameter identifying a rule to process at least one of the data values; and
mark-up data that identifies assignments of data values to data entry fields;
entering the received data into respective data entry fields of an electronic data entry form as identified by the mark-up;
processing the entered data values to obtain a payment result, the payment result comprising an accounts receivable application component that assigns the payment result to an open item;
transferring signaling data to the Web service, without input by a user of the first computer of an address of the Web service, by automatically reading the address information, and connecting to the Web service based on the address information, the signaling data including:
the control parameter;
at least one of the data values; and
a time stamp, the time stamp corresponding to at least one of a date or time when the data processing step has been scheduled, initiated, or performed;
storing the signaling data in a data file;
determining whether a size of the data file is greater than or equal to a predetermined limit; and
initiating transfer of the signaling data to a second computer when the size of the data file is determined to be greater than or equal to the predetermined limit, wherein the second computer is configured to:
receive the signaling data, before receipt of the payment result:
receive the payment result; and
process the payment result based on the received signaling data.

9. A data processing apparatus, comprising first, second, and third computers, and a Web service:
the first computer being configured to:
receive an XML document via a network, the XML document including:
address information corresponding to a Web service;
data values;

a control parameter identifying a rule to process at least one of the data values; and mark-up data that identifies assignments of data values to data entry fields;

enter the received data values into respective data entry fields of an electronic data entry form as identified by the mark-up data of the XML document;

transfer the entered data values to a second computer via the network; and transfer signaling data to the Web service, without input by a user of the first computer of an address of the Web service, by automatically reading the address information, and connecting to the Web service based on the address information, the signaling data including:

the control parameter;

at least one of the data values; and a time stamp, the time stamp corresponding to at least one of a date or time when the data processing step has been scheduled, initiated, or performed;

the second computer being configured to:

process the entered data values to obtain a payment result, the payment result comprising an accounts receivable application component in the second computer that assigns the payment result to an open item; and transmit the payment result to a third computer via the network;

the Web service being configured to:

store the signaling data in a data file;

determine whether a size of the data file is greater than or equal to a predetermined limit; and send the signaling data to the third computer when the size of the data file is determined to be greater than or equal to the predetermined limit; and the third computer being configured to:

receive the signaling data, before receipt of the payment result;

determine whether the payment result has been received;

determine whether the signaling data indicates that processing of the data values has been initiated to obtain the payment result; and send a reminder to the second computer upon expiration of a predetermined amount of time required by the timer module when the signaling data indicates that processing of the data values has been initiated and when the payment result has not been received.

10. A data processing system for entering data values into data entry fields of an electronic data entry form, comprising first, second, and third computers and a Web service:

the first computer being configured to:

receive an XML document via a network, the XML document including:

address information corresponding to a Web service;

data values;

a control parameter identifying a rule to process at least one of the data values; and mark-up data that identifies assignments of data values to the data entry fields;

enter the received data values into respective data entry fields of the electronic data entry form as identified by the mark-up data of the XML document;

transfer the entered data values entered to a second computer via the network; and transfer signaling data to the Web service, without input by a user of the first computer of an address of the Web service, by automatically reading the address information, and connecting to the Web service based on the address information, the signaling data including:

the control parameter;

at least one of the data values; and a time stamp, the time stamp corresponding to at least one of a date or time when the data processing step has been scheduled, initiated, or performed;

the second computer being configured to:

process the entered data values to obtain a payment result, the payment result comprising an accounts receivable application component in the second computer that assigns the payment result to an open item; and transmit the payment result to a third computer via the network;

the Web service being configured to:

store the signaling data in a data file;

determine whether a size of the data file is greater than or equal to a predetermined limit; and initiate transfer of the signaling data to the third computer when the size of the data file is determined to be greater than or equal to the predetermined limit; and the third computer being configured to:

receive the signaling data, before receipt of the payment result;

determine whether the payment result has been received;

determine whether the signaling data indicates that processing of the data values has been initiated to obtain the payment result; and send a reminder to the second computer when the signaling data indicates that processing of the data values has not been initiated and when the payment result has not been received.

11. The data processing system of claim 1, wherein the second computer comprises a reminder module for determining that a payment is overdue, and the reminder module downloads the signaling data from the Web service to find out if processing of the overdue payment was initiated.

12. The computer implemented data processing method of claim 7, wherein the control parameter is used for processing at least one of the data values by the first computer prior to entry into the electronic data entry form.

13. The computer implemented data processing method of claim 12 wherein the control parameter specifies a price rebate.

14. The computer implemented data processing method of claim 7, wherein the address information is a uniform resource locator.

15. The computer implemented data processing method of claim 7, wherein entering data values into respective data entry fields of an electronic data entry form of a first computer based on mark-up data identifying the data values and the respective data entry fields is performed in response to a drag and drop operation.

* * * * *